US012134176B2

(12) United States Patent
Kamijo et al.

(10) Patent No.: US 12,134,176 B2
(45) Date of Patent: Nov. 5, 2024

(54) ELECTRIC TOOL

(71) Applicant: MAXELL IZUMI CO., LTD., Matsumoto (JP)

(72) Inventors: Keiichiro Kamijo, Matsumoto (JP); Katsutoshi Kochiyama, Matsumoto (JP)

(73) Assignee: MAXELL IZUMI CO., LTD., Matsumoto (JP)

( * ) Notice: Subject to any disclaimer, the term of this patent is extended or adjusted under 35 U.S.C. 154(b) by 60 days.

(21) Appl. No.: 18/097,765

(22) Filed: Jan. 17, 2023

(65) Prior Publication Data

US 2023/0302621 A1 Sep. 28, 2023

(30) Foreign Application Priority Data

Mar. 22, 2022 (JP) ................................. 2022-045225

(51) Int. Cl.
*B25F 5/00* (2006.01)
*B25F 5/02* (2006.01)

(52) U.S. Cl.
CPC ................ *B25F 5/005* (2013.01); *B25F 5/02* (2013.01)

(58) Field of Classification Search
CPC ................................... B25F 5/005; B25F 5/02
See application file for complete search history.

(56) References Cited

U.S. PATENT DOCUMENTS 5,491,370 A * 2/1996 Schneider .............. H02K 11/33 310/68 R
10,312,653 B2 * 6/2019 Ballard .............. H01R 43/0427
11,759,937 B1 * 9/2023 Chuan ...................... F15B 11/15 91/287
2005/0120770 A1 * 6/2005 Frenken .................... B25F 5/02 72/453.16
2005/0223886 A1 * 10/2005 Oide ...................... B23D 17/06 91/428
2007/0214861 A1 * 9/2007 Lefavour ................ F16K 17/34 72/453.16
2014/0182874 A1 * 7/2014 Barezzani ............... B25B 27/10 173/217
2016/0363510 A1 * 12/2016 Kanack .................... B25B 27/10
2016/0368128 A1 * 12/2016 Uchiyama ............. F16K 17/048
2017/0252912 A1 * 9/2017 Barezzani .............. B23D 15/14
2018/0161889 A1 * 6/2018 Barezzani .............. H02G 1/005
2018/0161890 A1 * 6/2018 Barezzani ............ B23D 29/002
2019/0232481 A1 * 8/2019 Skinner .................... B25F 5/005
2020/0227964 A1 * 7/2020 Ronning .............. H02K 1/2733
2020/0254600 A1 * 8/2020 Kamijo .............. H01R 43/0427
2020/0298388 A1 * 9/2020 Norquist .............. B21D 39/048

FOREIGN PATENT DOCUMENTS

JP 2018-086696 A 6/2018

* cited by examiner

*Primary Examiner* — Lucas E. A. Palmer
(74) *Attorney, Agent, or Firm* — HAUPTMAN HAM, LLP

(57) ABSTRACT

There is provided a compact, lightweight, hydraulic electric tool which can perform a long-term operation by minimizing power consumption while preventing operation efficiency from being degraded due to a hot electric motor. An electric tool includes a main body having an oil tank, a hydraulic pump for feeding hydraulic oil to a cylinder part, and an electric motor for driving the hydraulic pump, and a tool head operated by a pressing force of a piston in the cylinder part in a state where the tool head is coupled to the main body. The oil tank is configured to cover a motor case.

4 Claims, 3 Drawing Sheets

ELECTRIC TOOL

CROSS-REFERENCE TO RELATED APPLICATION

This application is based upon and claims the benefit of priority of the prior Japanese Patent Application No. P2022-045225, filed on Mar. 22, 2022, and the entire contents of which are incorporated herein by reference.

TECHNICAL FIELD

The present invention relates to a hydraulic electric tool.

BACKGROUND ART

In the related art, a hydraulic electric tool is known (PTL 1: JP-A-2018-086696).

SUMMARY OF INVENTION

Technical Problem

In an electric tool, when a tool head operation such as cutting, tightening, pressing or crimping is repeated in a short period of time, an electric motor becomes hot, and operation efficiency is degraded. When the electric tool is further continuously used in a state where the electric motor is hot, there is a possibility of motor burning. In the related art, a structure for preventing the motor burning by forcibly cooling the electric motor has been proposed as an air-cooling structure or a water-cooling structure using a refrigerant. However, the air-cooling structure requires a ventilator window to be provided in a housing, and is susceptible to a failure due to intrusion of foreign substances such as dust and water droplets. Consequently, an operation environment is significantly restricted. When the ventilator window is not provided, a cooling effect is significantly reduced. Accordingly, it is difficult to continuously use the air-cooling structure. The water-cooling structure is large and heavy. Accordingly, the water-cooling structure is not suitable for a compact electric tool. Therefore, there has been a market demand for a compact, lightweight, and hydraulic electric tool which can perform a long-term operation by minimizing power consumption while preventing motor efficiency from being degraded due to the hot electric motor, even when the tool head is repeatedly operated in a short period of time.

Solution to Problem

The present invention is made in view of the above-described circumstances, and an object of the present invention is to provide a compact, lightweight, hydraulic electric tool which can perform a long-term operation by minimizing power consumption while preventing operation efficiency from being degraded due to a hot electric motor.

The present invention has been accomplished under the solutions as disclosed below.

According to an aspect of the present invention, there is provided an electric tool including a main body having a cylinder part, an oil tank, a hydraulic pump for feeding hydraulic oil inside the oil tank to the cylinder part, and an electric motor for driving the hydraulic pump, and a tool head operated by a pressing force of a piston in the cylinder part in a state where the tool head is coupled to the main body. A motor case in the electric motor is covered with the oil tank.

According to this configuration, the hydraulic oil inside the oil tank is configured to absorb heat exhausted from the electric motor. In this manner, operation efficiency can be prevented from being degraded due to the hot electric motor. In addition, the hydraulic oil for the hydraulic pump inside the main body is used. Therefore, the electric tool can be compact and lightweight without increasing the number of components. The heat exhausted from the electric motor can be used to raise a temperature of the hydraulic oil. In this manner, viscosity of the hydraulic oil can be lowered. Therefore, even under a low-temperature environment, it is possible to adopt a configuration which enables a more efficient hydraulic operation.

Depending on a type of the electric motor, power is supplied to the electric motor by using one or more types of a rechargeable battery, a DC power supply connection cable, an AC adapter, and a commercial power supply connection cable. As an example, the configuration includes a rechargeable battery for supplying the power to the electric motor, and an adapter for connecting the rechargeable battery to the main body. According to this configuration, it is not necessary to provide a power cord, and thus, a working range can be widened. For example, the rechargeable battery is connected to the adapter in a state of a battery pack. In this manner, an available time can be easily extended.

It is preferable that the electric motor is a brushless motor. According to this configuration, electromagnetic noise can be reduced, a longer life and higher efficiency can be achieved, and speed control can be easily achieved. Here, the brushless motor and a permanent magnet synchronous motor are synonymous. As an example, the electric motor is configured to be coupled to the hydraulic pump via a speed reducer. In this manner, while the brushless motor is rotated at a higher speed, high power can be easily achieved via the speed reducer. The speed reducer is disposed inside the oil tank, and the hydraulic oil inside the oil tank absorbs the heat exhausted from the speed reducer. Therefore, satisfactory operation efficiency can be achieved in a combination between the brushless motor and the speed reducer, and noise can be further easily reduced. A magnet filter is disposed inside the oil tank. Therefore, the speed reducer can be easily lubricated, and abrasion powder of the speed reducer can be easily removed.

As an example, a configuration is adopted in which the motor case in the electric motor is provided with a fin, and the fin can come into contact with the hydraulic oil inside the oil tank. According to this configuration, heat radiation efficiency can be easily improved by increasing a surface area of the motor case. A fin pitch in the fin is set to a pitch that forms a gap through which the hydraulic oil can pass. The fin is made of aluminum, iron, brass, or a known alloy, and is subjected to surface treatment such as alumite treatment when necessary.

As an example, one end part of the oil tank is configured to be in contact with an outer peripheral surface of the motor case. As an example, a configuration is adopted in which the hydraulic oil inside the oil tank can come into contact with the outer peripheral surface of the motor case. As an example, the oil tank is configured to cover 0.5 times or more an axial length of the outer peripheral surface in the motor case. As an example, a configuration is adopted in which the hydraulic oil inside the oil tank can come into contact with an area having a length of 0.5 times or more the axial length of the outer peripheral surface of the motor case. As an example, a configuration is adopted in which a side opposite to a drive shaft side in the motor case protrudes from the oil tank. As an example, a configuration is adopted in which the hydraulic oil inside the oil tank does not come into contact with the side opposite to the drive shaft side in the motor case. As an example, a configuration is adopted in which the hydraulic oil inside the oil tank does not come into contact with a power supply line in the electric motor.

As an example, a configuration is adopted in which one end part of the oil tank is locked to the motor case, and the other end part is locked to the hydraulic pump. In this manner, while the amount of the hydraulic oil can be minimized, the hydraulic oil can more reliably absorb the heat exhausted from the electric motor. The center of gravity is aligned with a position close to a handle gripped by an operator. Therefore, the electric tool can easily have a compact, lightweight, and portable shape.

As an example, a configuration is adopted as follows. The hydraulic pump includes a swash plate cam that rotates around an axis passing through a drive shaft of the electric motor, a plurality of plungers disposed around the axis passing through the drive shaft in the cylinder part, and reciprocating while coming into contact with the swash plate cam, and a check valve, and feeds the hydraulic oil from the oil tank to the cylinder part via the check valve.

According to this configuration, a pressure can be linearly increased in accordance with a rotation speed of the swash plate cam. Therefore, an operation of the tool head can be easily controlled. As an example, a connection portion between the hydraulic pump and the cylinder part has a first pipe portion for feeding the hydraulic oil from the oil tank to the cylinder part, and the check valve is provided in an intermediate portion of the first pipe portion. As an example, a connection portion between the hydraulic pump and the cylinder part has a second pipe portion for returning the hydraulic oil from the cylinder part to the hydraulic pump. As an example, a return valve is provided in an intermediate portion of the second pipe portion. As an example, a connection portion between the hydraulic pump and the cylinder part has a third pipe portion for returning the hydraulic oil from the cylinder part to the hydraulic pump. As an example, a relief valve is provided in an intermediate portion of the third pipe portion.

Advantageous Effects of Invention

According to the present invention, while operation efficiency can be prevented from being degraded due to a hot electric motor, it is possible to realize a compact, lightweight, hydraulic electric tool which can perform a long-term operation by minimizing power consumption.

DESCRIPTION OF EMBODIMENTS

Figure 1:
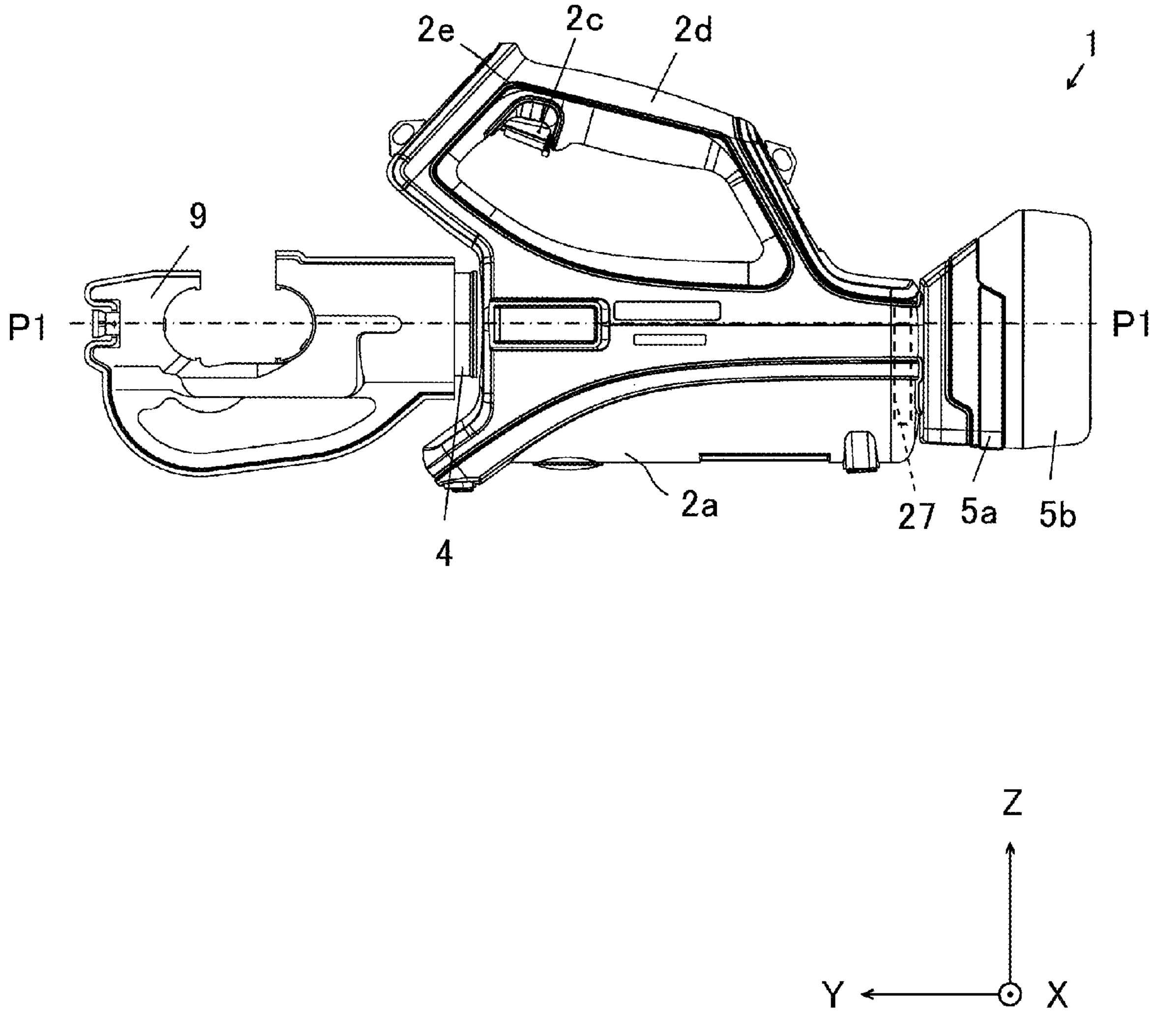
FIG. 1 is a schematic side view illustrating an example of an electric tool according to an embodiment of the present invention.

Hereinafter, an embodiment according to the present invention will be described in detail with reference to the drawings. The present embodiment provides an electric tool 1 such as an electric cutting machine, an electric pressing machine, and an electric crimping machine. In all drawings for describing the embodiment, the same reference numerals will be assigned to members having the same function, and repeated description thereof may be omitted in some cases.

Figure 2:
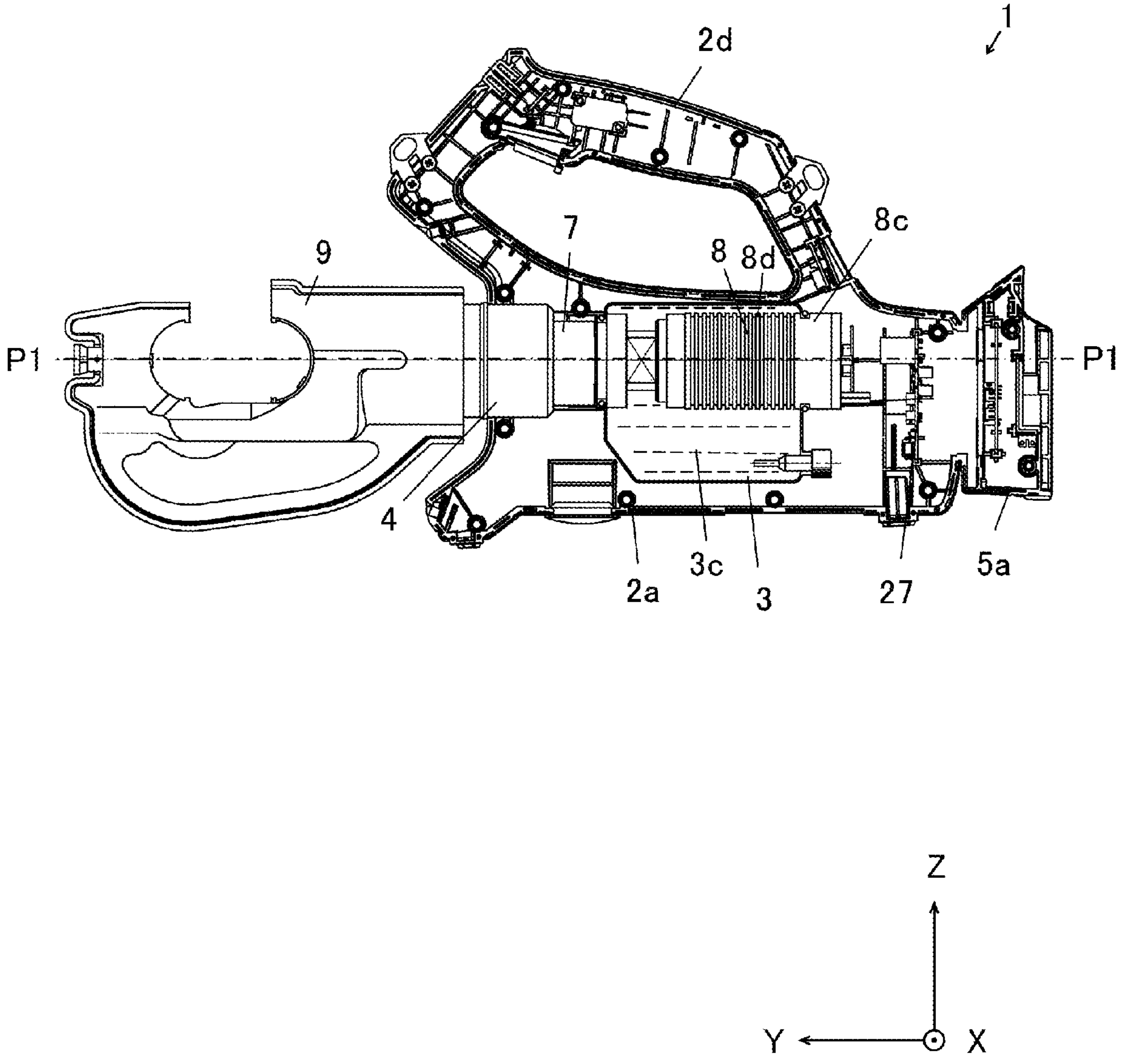
FIG. 2 is a schematic internal structure diagram illustrating an internal structure in the electric tool in FIG. 1.

FIGS. 1 and 2 are schematic views illustrating an example of the electric tool 1 according to the present embodiment. The electric tool 1 is a cordless type hydraulic electric tool including a main body 2, a tool head 9 operated by a pressing force of a piston 4*a* in a cylinder part 4 of the main body 2 in a state where the tool head 9 is coupled to the main body 2, and a rechargeable battery 5*b* for supplying power to an electric motor 8 of the main body 2. The electric tool 1 is gripped and used by a hand of an operator at a jobsite. The piston 4*a* reciprocates along an axis P1 of a drive shaft 8*a* of the electric motor 8. That is, the piston 4*a* moves forward to a side of an arrow in a Y-direction in the drawing, and moves rearward to a side opposite to the arrow in the Y-direction in the drawing. FIG. 1 illustrates an example of the electric tool 1 configured to include the tool head 9 for electric pressing machine. The electric tool 1 may be a dedicated tool to which the tool head 9 is directly coupled, or may be a multi-function tool in which the tool head 9 is exchangeable. Here, in order to facilitate description of a positional relationship of each part of the electric tool 1, directions are indicated by arrows X, Y, and Z in the drawing. The electric tool 1 is normally operated in any direction.

As illustrated in FIGS. 2 and 3A to 3C, the main body 2 includes the cylinder part 4, a hydraulic pump 7 coupled to the cylinder part 4 to have an integral structure, and an oil tank 3 attached to an outer side of the hydraulic pump 7 and attached to an outer side of the electric motor 8. In the cylinder part 4, the piston 4*a* is disposed in a piston chamber 4*b*, and a coil spring 4*c* is disposed along an outer periphery of the piston 4*a* in alignment with an axis of the piston 4*a*. The hydraulic pump 7 feeds hydraulic oil 3*c* stored in the oil tank 3 to the piston chamber 4*b* of the cylinder part 4.

The main body 2 includes the electric motor 8 coupled to the hydraulic pump 7 via a speed reducer 6 to drive the hydraulic pump 7, and a control circuit 27 that performs driving control on the electric motor 8. The rechargeable battery 5*b* for supplying power to the electric motor 8 and the control circuit 27 is connected to an adapter 5*a* of the main body 2 in a state of a battery pack. The adapter 5*a* is coupled to a rear end part of the main body 2. The tool head 9, the main body 2, the adapter 5*a*, and the rechargeable battery 5*b* are disposed in order in a direction of the axis P1. A handle 2*d* as a hand portion gripped by an operator is provided to form an integral structure with a housing 2*a* in the main body 2 in a central part of the main body 2 in the direction of the axis P1. The handle 2*d* has a start switch 2*c* for starting the electric motor 8 and feeding the hydraulic oil 3*c* stored in the oil tank 3 to the cylinder part 4, and a return switch 2*e* for returning the hydraulic oil 3*c* from the cylinder part 4 to the oil tank 3. Here, the battery pack configured to include the rechargeable battery 5*b* such as a lithium-ion battery and a nickel-metal hydride battery is connected to the adapter 5*a* of the main body 2, and the adapter 5*a* is coupled to the main body 2. According to this configuration, the electric tool 1 is excellent in portability.

As an example, the electric motor 8 is an inner rotor type brushless motor. As an example, a motor case 8*c* in the electric motor 8 is provided with a fin 8*d* for heat radiation, and a configuration is adopted in which the fin 8*d* can come into contact with the hydraulic oil 3*c* stored in the oil tank 3.

Figure 3A:
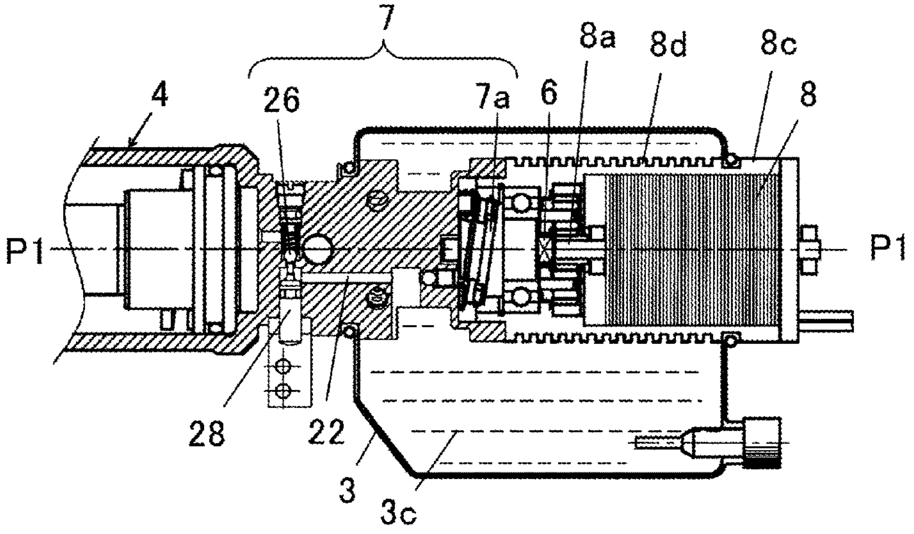
FIG. 3A is a schematic sectional view in which an internal structure of a drive system in the electric tool in FIG. 1 is illustrated in a side view.
Figure 3B:
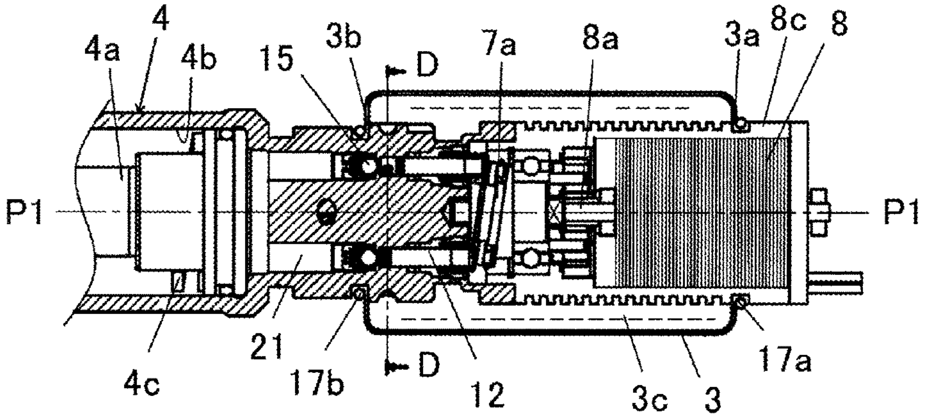
FIG. 3B is a schematic sectional view in which the internal structure of the drive system in the electric tool in FIG. 1 is illustrated in a plan view.
Figure 3C:
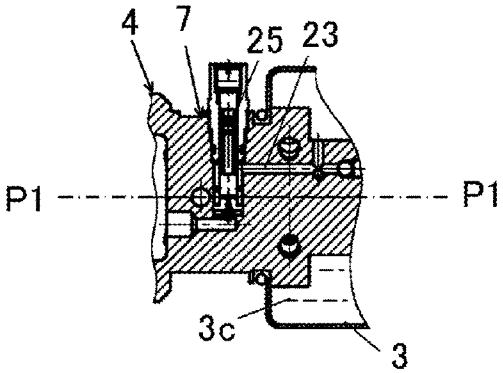
FIG. 3C is a sectional view taken along line C-C in FIG. 3B.
Figure 3D:
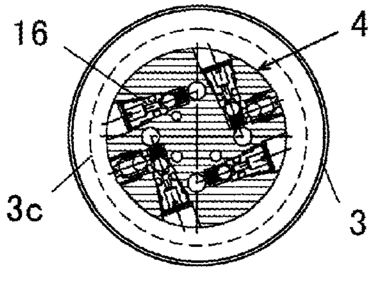
FIG. 3D is a partial sectional view when a viewing angle in FIG. 3B is changed.

As illustrated in FIG. 3A, the hydraulic pump 7 includes a swash plate cam 7*a* coupled to the drive shaft 8*a* of the electric motor 8 to which the speed reducer 6 is directly coupled or the drive shaft 8*a* of the electric motor 8 having the speed reducer 6 and rotated by a driving force of the electric motor 8, and a plurality of plungers 12 disposed around the axis P1 passing through the drive shaft 8*a* in the cylinder part 4 and reciprocating while coming into contact with the swash plate cam 7*a*. A check valve 16 for preventing a backflow of the hydraulic oil 3*c* from the plunger 12 to the oil tank 3 is disposed at a position (position in a cross section taken along line C-C) close to the hydraulic pump 7 on a secondary side of the plunger 12.

The oil tank 3 is a bag-like body made of an oil-resistant, expandable, and contractible rubber material. A configuration is adopted in which the oil tank 3 is locked to both the hydraulic pump 7 and the electric motor 8, and the motor case 8*c* is covered with the oil tank 3. As illustrated in FIGS. 3A to 3D, a connection portion between the hydraulic pump 7 and the cylinder part 4 has a first pipe portion 21 for feeding the hydraulic oil 3*c* from the oil tank 3 to the cylinder part 4, and a check valve 15 is provided in an intermediate portion of the first pipe portion 21. In addition, a connection portion between the hydraulic pump 7 and the cylinder part 4 has a second pipe portion 22 for returning the hydraulic oil 3*c* from the cylinder part 4 to the hydraulic pump 7, and a return valve 26 is provided in an intermediate portion of the second pipe portion 22. A connection portion between the hydraulic pump 7 and the cylinder part 4 has a third pipe portion 23 for returning the hydraulic oil 3*c* from the cylinder part 4 to the hydraulic pump 7, and a relief valve 25 is provided in an intermediate portion of the third pipe portion 23.

One end part 3*a* of the oil tank 3 is locked to the motor case 8*c*, and the other end part 3*b* is locked to the hydraulic pump 7. As an example, the one end part 3*a* of the oil tank 3 is curled outward, and is locked and fixed to an outer peripheral groove of the motor case 8*c* by a first locking material 17*a* which is a rubber ring such as an O-ring or a binding band. Similarly, the other end part 3*b* of the oil tank 3 is curled outward, and is locked and fixed to an outer peripheral groove of the hydraulic pump 7 by a second locking material 17*b* which is a rubber ring such as an O-ring or a binding band.

According to the present embodiment, a configuration is adopted in which the hydraulic oil 3*c* inside the oil tank 3 absorbs the heat exhausted from the electric motor 8 or the speed reducer 6. In this manner, operation efficiency can be prevented from being degraded due to the hot electric motor 8 or the hot speed reducer 6. In addition, the existing hydraulic oil 3*c* is used for the main body 2. Therefore, the electric tool 1 can be compact and lightweight without increasing the number of components. The heat exhausted from the electric motor 8 or the speed reducer 6 can be used to raise a temperature of the hydraulic oil 3*c*. In this manner, viscosity of the hydraulic oil 3*c* can be lowered even under a low-temperature environment. Therefore, it is possible to adopt a configuration which enables a more efficient hydraulic operation.

As an example, the tool head 9 performs a gripping operation, a temporary gripping operation, or a gripping preparation operation in a low-pressure stage leading to a first pressure, and performs a pressing operation or a crimping operation in a high-pressure stage leading to a second pressure. When the tool head 9 completes predetermined work, the relief valve 25 is opened to reduce the pressure in the cylinder part 4. When a position of the piston 4*a* is returned, a return pin 28 is operated to open the return valve 26, and the hydraulic oil 3*c* is returned to the oil tank 3 by a restoring force of the coil spring 4*c*. The electric tool 1 may have an automatic return portion. In a configuration having the automatic return portion, the tool head 9 returns to a state before the work when the predetermined work is completed by the tool head 9.

The present invention is not limited to the embodiment described above, and various modifications can be made within the scope not departing from the present invention.

What is claimed is:

1. An electric tool comprising:

a main body having a cylinder part, an oil tank, a hydraulic pump for feeding hydraulic oil inside the oil tank to the cylinder part, and an electric motor coupled to the hydraulic pump via a speed reducer to drive the hydraulic pump; and a tool head operated by a pressing force of a piston in the cylinder part in a state where the tool head is coupled to the main body, a motor case in the electric motor is covered with the oil tank, one end part of the oil tank is locked to the motor case, and the other end part is locked to the hydraulic pump, and wherein the speed reducer is in the oil tank, a drive shaft side in the motor case is in the oil tank, and a side opposite to the drive shaft side in the motor case protrudes from the oil tank.

2. The electric tool according to claim 1, wherein the electric motor is a brushless motor, and the motor case in the electric motor is provided with a fin, and the fin is configured to come into contact with the hydraulic oil inside the oil tank.

3. An electric tool comprising:

a main body having a cylinder part, an oil tank, a hydraulic pump for feeding hydraulic oil inside the oil tank to the cylinder part, and an electric motor coupled to the hydraulic pump via a speed reducer to drive the hydraulic pump, a control circuit performs driving control on the electric motor, a battery pack supplies power to the electric motor and the control circuit, and an adapter connects the battery pack to a rear end part of the main body; and a tool head operated by a pressing force of a piston in the cylinder part in a state where the tool head is coupled to the main body, a motor case in the electric motor is covered with the oil tank, one end part of the oil tank is locked to the motor case, and the other end part is locked to the hydraulic pump, and wherein the speed reducer is in the oil tank, a drive shaft side in the motor case is in the oil tank, and a side opposite to the drive shaft side in the motor case protrudes from the oil tank.

4. The electric tool according to claim 3, wherein the electric motor is a brushless motor, and the motor case in the electric motor is provided with a fin, and the fin is configured to come into contact with the hydraulic oil inside the oil tank.

* * * * *